(12) United States Patent
Blase et al.

(10) Patent No.: US 7,394,174 B2
(45) Date of Patent: Jul. 1, 2008

(54) BRUSHLESS D.C. MOTOR

(75) Inventors: Benno Blase, Weinstadt (DE); Andreas Schlegel, Stuttgart (DE)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 11/133,229

(22) Filed: May 20, 2005

(65) Prior Publication Data

US 2005/0212367 A1   Sep. 29, 2005

Related U.S. Application Data

(62) Division of application No. 10/322,520, filed on Dec. 19, 2002.

(30) Foreign Application Priority Data

Dec. 21, 2001   (GB)   ................... 0130602.6

(51) Int. Cl.
| | |
|---|---|
| *H02K 21/12* | (2006.01) |
| *H02K 1/28* | (2006.01) |
| *H02K 1/27* | (2006.01) |
| *H02K 15/03* | (2006.01) |
| *H01F 7/02* | (2006.01) |

(52) U.S. Cl. .................. 310/43; 310/68 B; 310/156.05; 310/156.08; 310/216

(58) Field of Classification Search .................. 310/43, 310/44, 186
See application file for complete search history.

(56) References Cited

U.S. PATENT DOCUMENTS

| 3,644,067 A | | 2/1972 | Yowell et al. | |
|---|---|---|---|---|
| 4,698,538 A | | 10/1987 | Yoshida | |
| 4,726,746 A | | 2/1988 | Takada et al. | |
| 4,737,674 A | * | 4/1988 | Miyao | ........................ 310/268 |
| 4,796,354 A | * | 1/1989 | Yokoyama et al. | ............ 29/608 |
| 4,841,186 A | * | 6/1989 | Feigel et al. | ........... 310/156.12 |
| 4,888,512 A | * | 12/1989 | Shimizu | ................ 310/156.43 |
| 4,954,736 A | * | 9/1990 | Kawamoto et al. | ..... 310/156.21 |
| 4,998,865 A | | 3/1991 | Nakanishi et al. | |
| 5,041,749 A | | 8/1991 | Gaser et al. | |
| 5,053,664 A | | 10/1991 | Kikuta et al. | |
| 5,145,614 A | * | 9/1992 | Kuroda | ........................ 264/429 |
| 5,221,503 A | * | 6/1993 | Ward et al. | ................... 264/104 |
| 5,315,191 A | * | 5/1994 | Suzuki | ................. 310/40 MM |
| 5,327,064 A | | 7/1994 | Arakawa et al. | |
| 5,345,130 A | * | 9/1994 | Kliman et al. | ......... 310/156.13 |
| 5,356,272 A | | 10/1994 | Nagata et al. | |

(Continued)

FOREIGN PATENT DOCUMENTS

DE            2628729 A        1/1978

(Continued)

*Primary Examiner*—Burton Mullins
(74) *Attorney, Agent, or Firm*—Birch, Stewart, Kolasch & Birch, LLP

(57) ABSTRACT

The brushless direct current motor comprises a housing 10, a stator 13 and a rotor 11 within the housing, windings on the stator, sensors for sensing the position of the rotor relative to the stator and electronic circuitry for switching the current in the windings in response to outputs from the sensors to cause the rotor to rotate relative to the stator. The sensors and at least a part of the electronic circuitry are encapsulated in an electrically insulating and fuel resistant material in a container within the housing.

13 Claims, 6 Drawing Sheets

U.S. PATENT DOCUMENTS

| | | | |
|---|---|---|---|
| 5,399,075 A | | 3/1995 | Frank et al. |
| 5,418,416 A | * | 5/1995 | Muller ................ 310/186 |
| 5,454,697 A | | 10/1995 | Nakanishi |
| 5,500,994 A | | 3/1996 | Itaya et al. |
| 5,717,268 A | * | 2/1998 | Carrier et al. .......... 310/156.06 |
| 5,788,210 A | | 8/1998 | Mimura et al. |
| 5,939,807 A | | 8/1999 | Patyk et al. |
| 5,961,293 A | | 10/1999 | Clemmons et al. |
| 6,153,957 A | * | 11/2000 | Takano ................ 310/71 |
| 6,198,189 B1 | | 3/2001 | Takahashi et al. |
| 6,296,458 B1 | | 10/2001 | Zacher et al. |
| 6,326,748 B1 | | 12/2001 | Moroto et al. |
| 6,734,589 B2 | | 5/2004 | Kogure et al. |
| 6,784,582 B1 | * | 8/2004 | Kolomeitsev et al. .. 310/156.38 |

FOREIGN PATENT DOCUMENTS

| | | | |
|---|---|---|---|
| DE | 3126100 A1 | | 1/1983 |
| EP | 0558181 A1 | | 1/1993 |
| EP | 0 565 040 | | 10/1993 |
| EP | 0 872 945 | | 10/1998 |
| EP | 0 980 081 | | 2/2000 |
| EP | 1003270 A1 | | 5/2000 |
| GB | 1340800 | | 12/1973 |
| GB | 2149976 A | | 6/1985 |
| JP | 57-148567 | * | 9/1982 |
| JP | 60-190153 | | 9/1985 |
| JP | 61-210857 | | 9/1986 |
| JP | 2-311147 | * | 12/1990 |
| JP | 5071436 A | | 3/1993 |
| JP | 8126265 A | | 5/1996 |
| JP | 9215236 A | | 8/1997 |
| JP | 11-299207 | * | 10/1999 |
| JP | 2000-102201 | * | 4/2000 |
| JP | 2001-37124 | * | 2/2001 |
| JP | 2001-178040 | * | 6/2001 |
| JP | 2001-204160 A | | 7/2001 |
| WO | WO-97/45917 | | 12/1997 |
| WO | 99/12248 | * | 3/1999 |
| WO | WO 01/59288 A2 | | 8/2001 |

* cited by examiner

BRUSHLESS D.C. MOTOR

This application is a Divisional of co-pending application Ser. No. 10/322,520, filed on Dec. 19, 2002, and for which priority is claimed under 35 U.S.C. § 120; and this application claims priority of Application No. 0130602.6 filed in Great Britain on Dec. 21, 2001 under 35 U.S.C. § 119; the entire contents of all are hereby incorporated by reference.

This invention relates to a brushless direct current motor and more particularly but not exclusively to such a motor for use in conjunction with a fuel pump.

Conventional permanent magnet direct current (PMDC) motors are traditionally designed with relatively inexpensive commutating parts comprising a commutator and a brush/leaf system. For many specific applications these brush-type motors will keep their importance, especially at the lower end of the applications range.

On the other hand, the dependence upon electronic control systems is growing, from varied car applications at different voltages to professional power tools. Meanwhile, parameters such as long life, efficiency, reliability, low electro-magnetic interference and noise are becoming of greater importance.

Brushless direct current (BLDC) motor technology makes it possible to achieve these requirements. Problems associated with brushes are eliminated. Advances in MOSFET and surface-mount technology lead to lower voltage drop (with a reduction of heat sinking), to smaller required space and to a tendency of price reduction.

According to a first aspect of the invention there is provided a brushless direct current motor comprising a housing, a stator and a rotor within the housing, windings on the stator or the rotor, sensors for sensing the position of the rotor relative to the stator and electronic circuitry for switching the current in the windings in response to outputs from the sensors to cause the rotor to rotate relative to the stator, the sensors and at least a part of the electronic circuitry being encapsulated in an electrically insulating material in a container within the housing.

According to a second aspect of the invention there is provided a brushless direct current motor comprising a wound stator and a permanent magnet rotor, the rotor having a laminated core and being overmoulded with magnetisable material magnetized subsequent to molding.

The invention will now be more particularly described, by way of example, with reference to the accompanying drawings, wherein:

FIG. 1 is a perspective view of one embodiment of a brushless direct current motor according to the present invention, FIG. 2 is a cut away view of the motor shown in FIG. 1, FIG. 3 is a perspective exploded view of the container for containing for electronic circuitry of the motor shown in FIGS. 1 and 2, FIG. 4 is a perspective view of the container of FIG. 3 mounted on the stator and containing the electronic circuitry.

Figure 1:
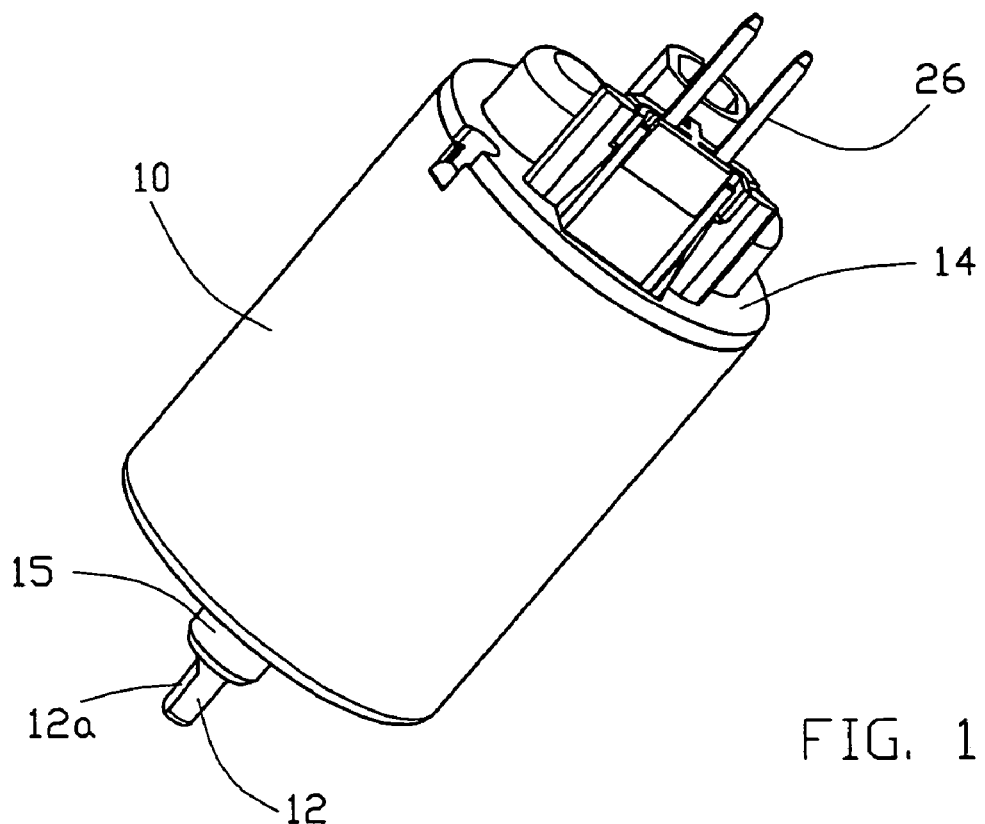
Figure 2:
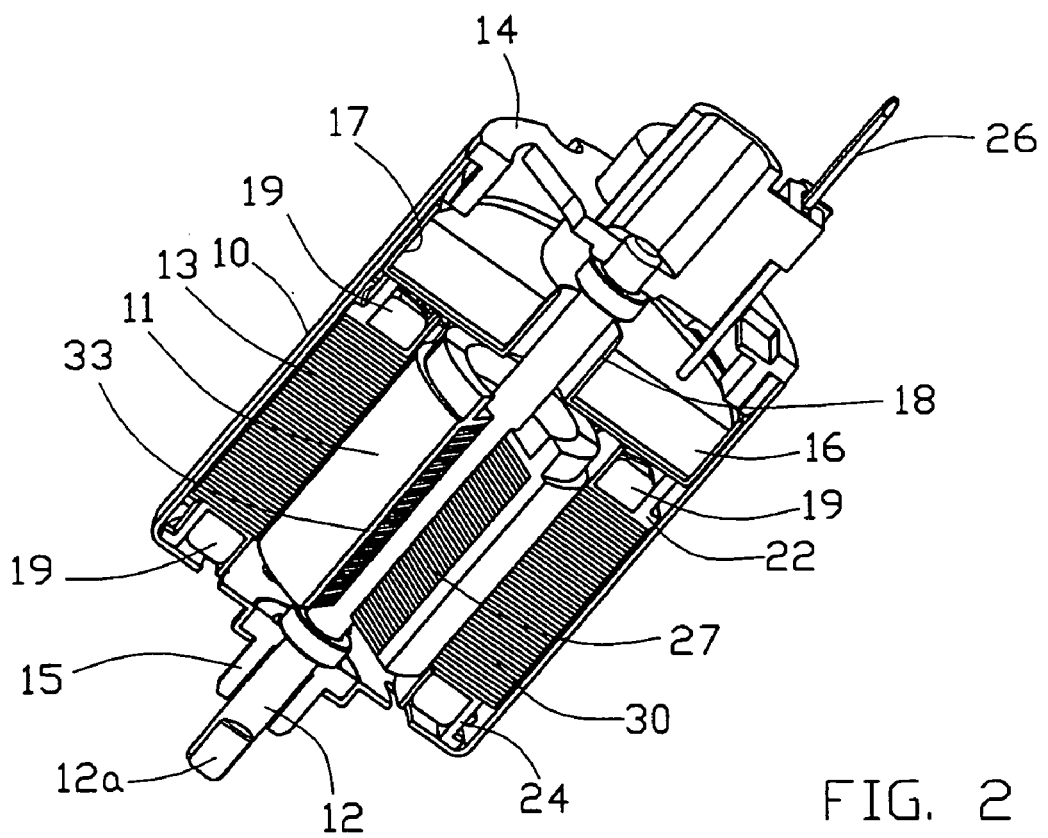

Referring now to the drawings, the brushless direct current motor shown therein comprises a deep drawn outer housing 10, a rotor 11 including a shaft 12 having a flat 12a at the end projecting from the closed end of the housing 10, a wound stator 13 surrounding the rotor 11, an end cap 14 closing the open end of the housing 10, and a container 16 within the housing 10 for sensors and electronic circuitry. The wound stator 13 comprises a stator winding 19 wound about a stack of stator laminations 30.

The motor has an overall appearance similar to that of a conventional permanent magnet direct current motor having commutating parts comprising a commutator and brush/leaf system. The motor has particular application as a fuel pump motor, but also has other uses.

Figure 3:
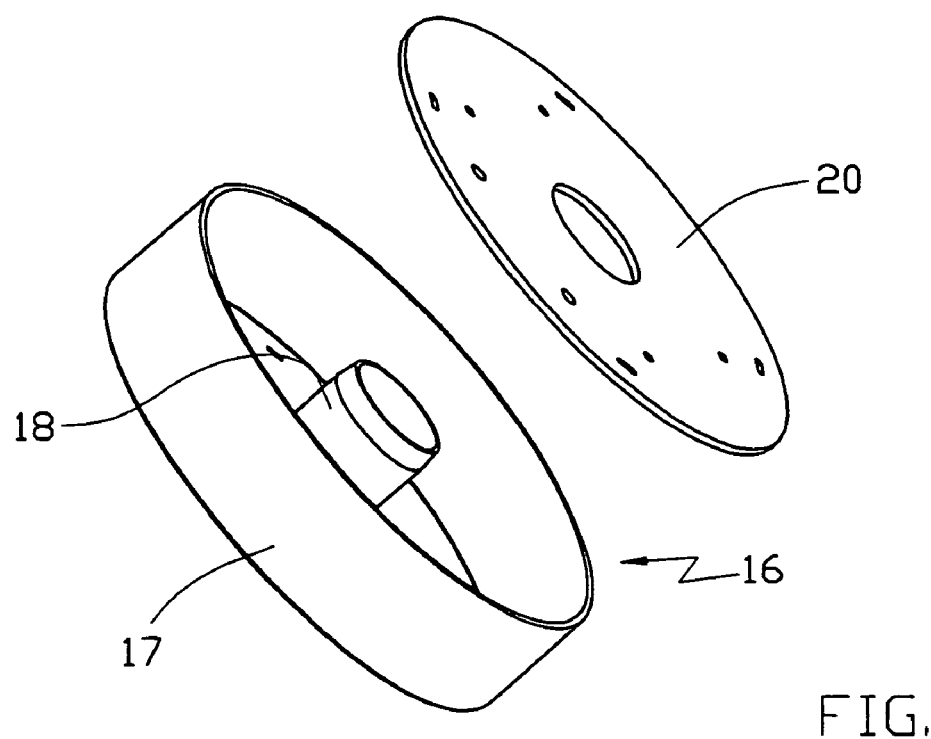
Figure 4:
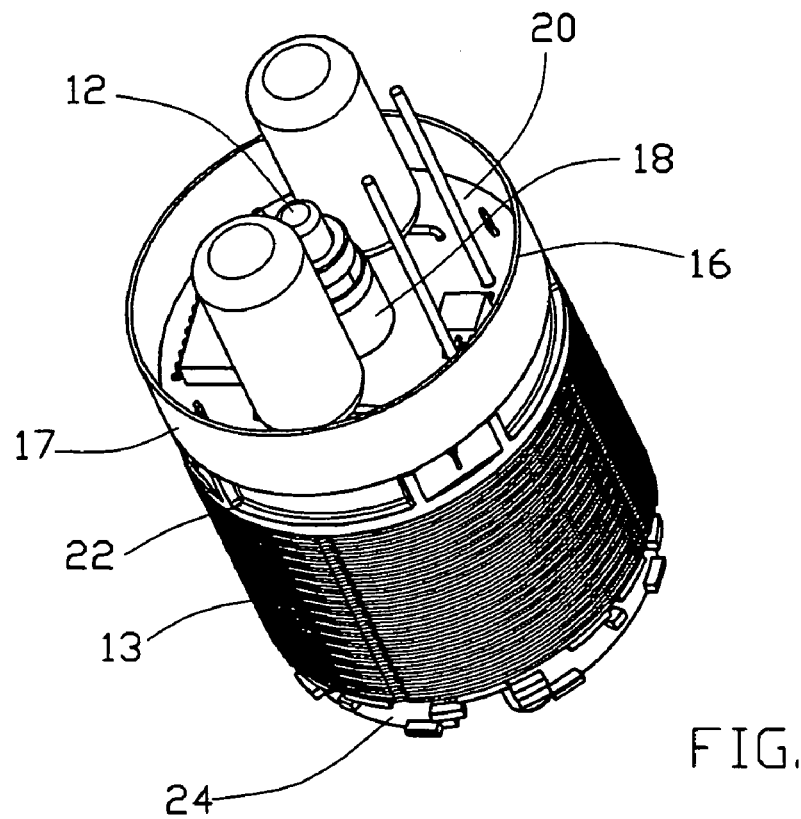
Figure 5:
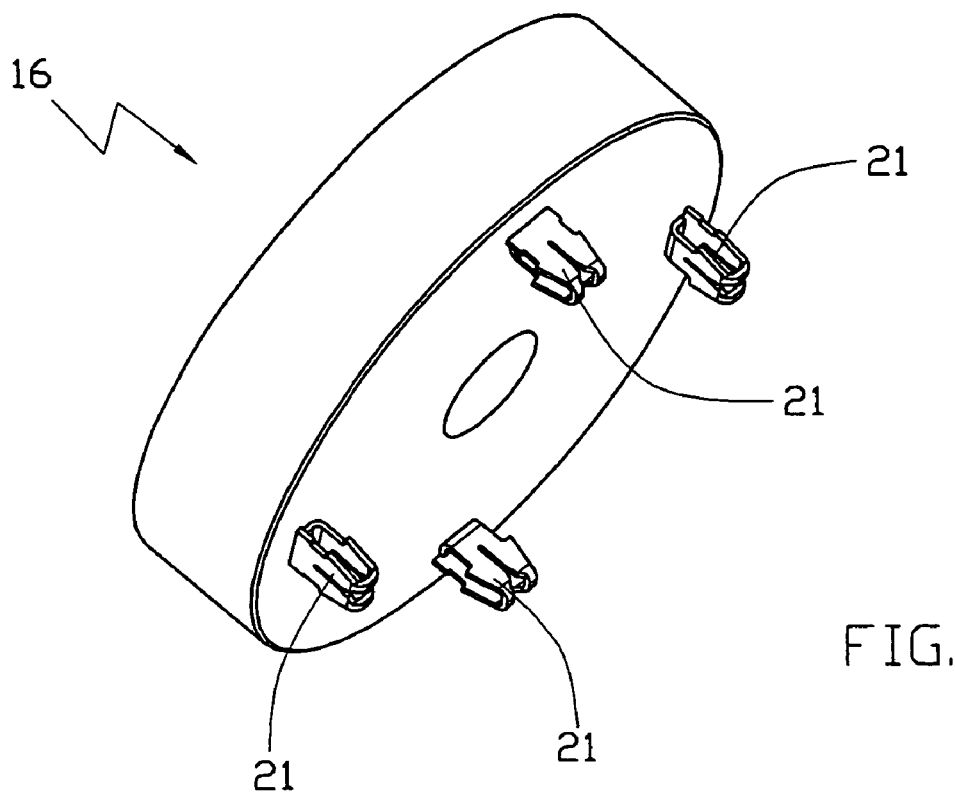
FIG. 5 is a perspective underneath view of the container shown in FIG. 3.

Referring now to FIGS. 3 to 5, the container 16 comprises a cylindrical bowl 17 having an integral sleeve 18 upstanding from the base of the bowl. The container is typically formed of Polyacetal (POM) and contains sensors, typically in the form of Hall-effect sensors, for sensing the position of the rotor 11 relative to the stator 13 and electronic circuitry mounted on an annular printed circuit board 20 which fits over the upstanding sleeve 18. Ideally the Hall-effect sensors lie flat on the printed circuit board 20. This is advantageous as compared to conventional "standing" hall sensors because it is easier to assemble and more reliable against fuel and vibrations after full encapsulation. Also, it allows a reduction in distance between the sensors and the planar top surface of the permanent magnet rotor. The circuitry switches the current in the stator windings in known manner in response to outputs from the sensors to cause the rotor to rotate relative to the stator. The sensors and electronic circuitry are then encapsulated in electrically insulating material, typically epoxy resin, which fills or substantially fills the container 16. The sleeve 18 is dimensioned such as to allow the rotor shaft 12 to extend therethrough and to allow fuel from the fuel pump to flow therethrough.

The sensors and most of the electronic components, including all electrically conductive parts thereof, are fully encapsulated. Only such parts as, for example, electrical terminals and/or large capacitors will not be encapsulated fully.

As shown in FIG. 5, the underside of the base of the bowl 17 has four insulation displacement connectors 21 for direct connection to windings of the stator 13. The container 16 and its contents can be pre-assembled allowing it to be "plugged" into the motor.

The thermal conductivity of the encapsulating material may not be too important because of the cooling effect of fuel passing through the sleeve 18.

Figure 6:
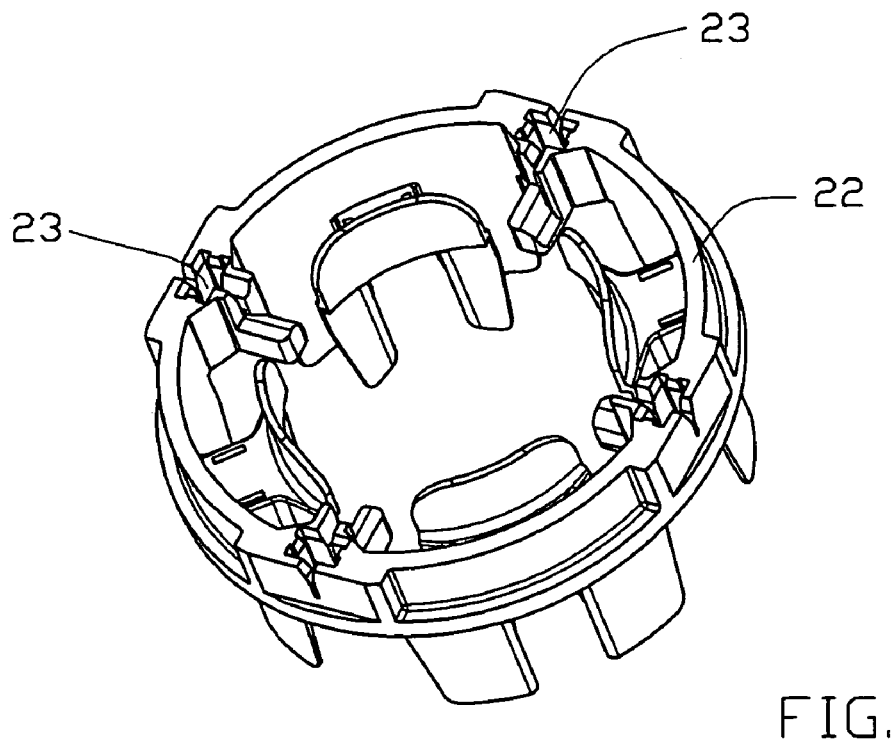
FIG. 6 is a perspective view of a front insulator of the motor.

FIG. 6 shows in detail a front insulator 22 which is placed on the stator and which has the same number of slots 23 (four in this example) for receiving the stator windings and the insulation displacement connections 21 on the container 16.

Instead of mounting the sensors and the electronic circuitry on a printed circuit board, the internal bottom surface of the container 16 could have an electrically conductive pattern imprinted thereon. This can take the form of a heat-press foil applied with a heat-press stamp. All electronic components can then be automatically assembled on the bowl's inner surface and subsequently encapsulated. Another advantage of this technique is a further reduction in the distance between hall sensors and the planar top surface of the rotor's magnet resulting in increased magnet field strength for position detection.

The motor also has a rear insulator 24 similar to but not identical to the front insulator 22.

The end cap 14 is connected to the housing 10 such as by crimping the rim of the housing 10 on the end cap at e.g. two positions. This end cap 14 supports or defines a bearing for the rotor shaft 12 and also includes integral features needed for a customer's fuel pump. A termination 26 is provided on the end cap 14 for connection to an external supply.

A sleeve 15 is provided at the other end of the motor. The sleeve 15 is typically formed of Polyphenylensulfide (PPS). This material has a high heat dimensional stability, low elongation and extremely good resistance against all kinds of aggressive fuels. The sleeve 15 supports or defines a bearing for the rotor shaft 12 and is also for attachment to a customer's fuel pump by press fitting into a hole in the fuel pump housing. Conventionally, the sleeve 15 has been part of the pump housing. It is now a part of the motor. This is advantageous as it serves the duel purpose of supporting or defining a bearing for the rotor shaft 12 and as a connecting/aligning element for the pump housing and allows the motor to be fully tested before supply to a customer.

The use of a brushless direct current motor as opposed to a conventional commutator motor makes a radial and axial reduction of motor dimensions possible.

Referring now to FIGS. 7 to 11, the rotor comprises a rotor shaft 12 and a laminated core 27 overmoulded with material 33 magnetized subsequent to molding.

Figure 7:
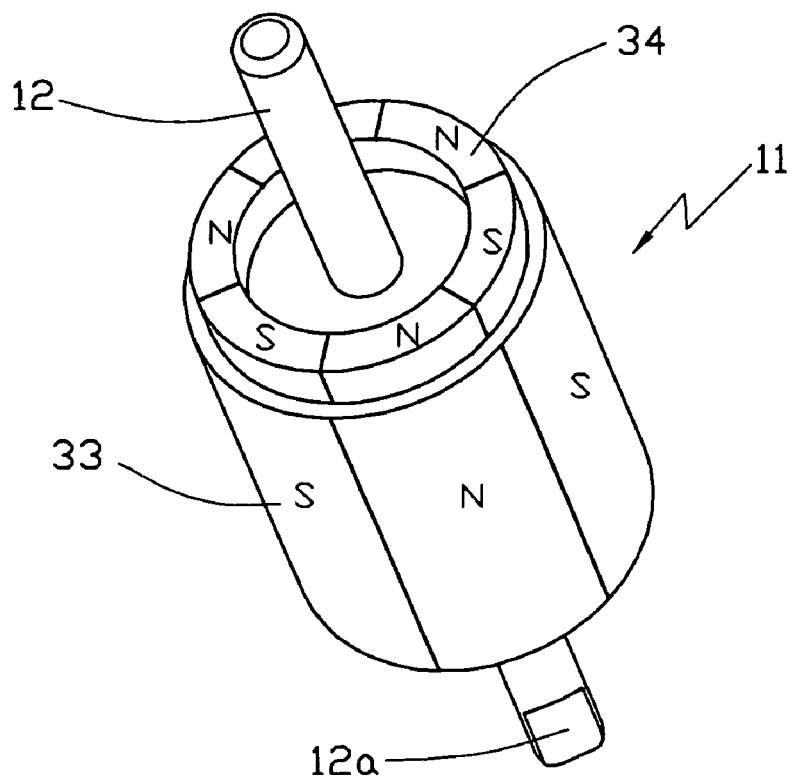
FIG. 7 is a perspective view of the rotor of the motor.
Figure 8:
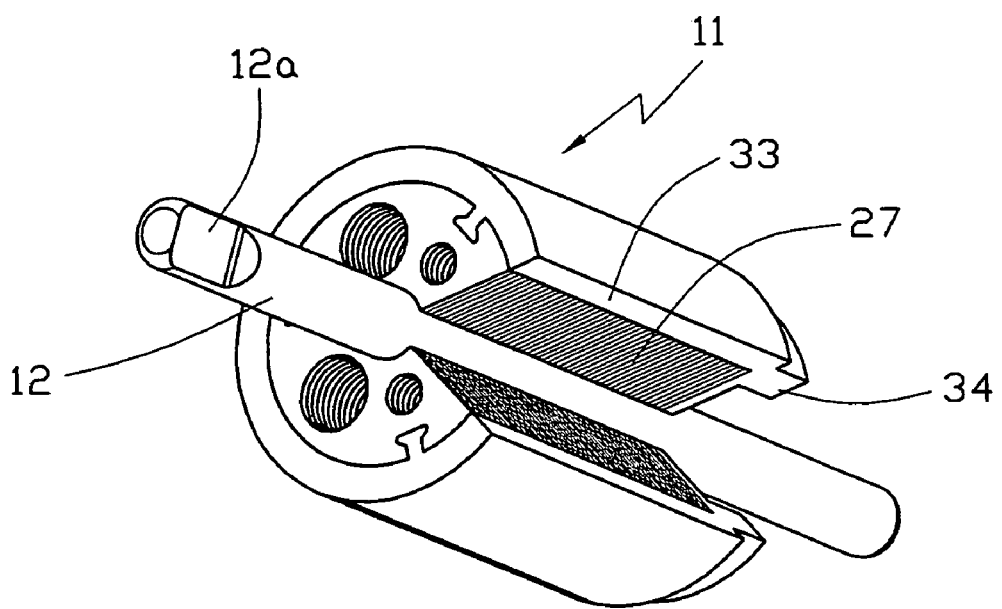
FIG. 8 is a partly broken away view of the rotor shown in FIG. 7.
Figure 9:
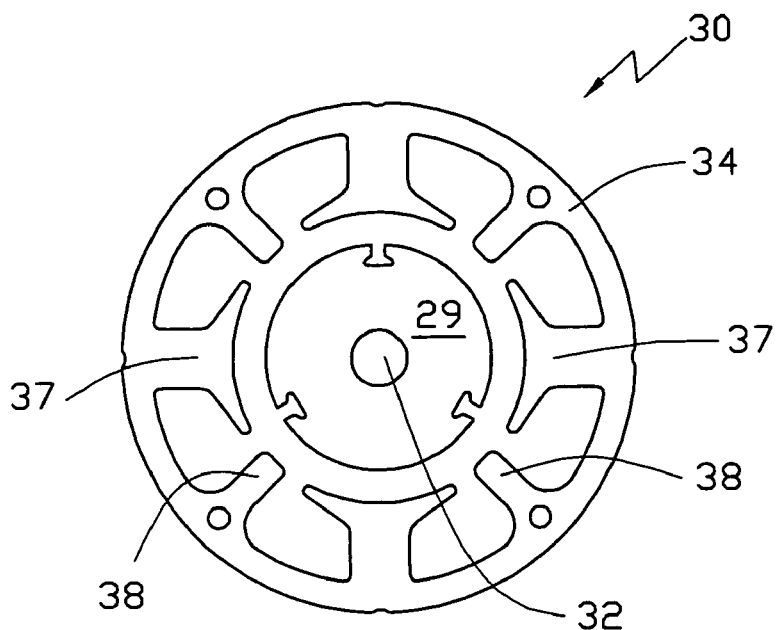
FIG. 9 is a plan view showing the rotor and stator laminations of the motor.

The laminated core 27 comprises a plurality of rotor laminations 29. As shown in FIG. 9, these laminations are stamped from sheet metal and maybe stamped at the same time as stator laminations 30 to save the cost of a separate core. The rotor laminations 29 have three equi-angularly spaced, radially inwardly extending, slots 31 and a central aperture 32 for mounting the laminations on the rotor shaft 12. A stack of these laminations 30 are overmoulded with magnetisable material 33, typically thermoplastical bonded NdFeB compound and this (isotropic) material 33 is magnetized (as shown in FIG. 7) subsequent to molding. The ovennoulding may also include an integral ring 34 which can be magnetized to act like an encoding disc to give a higher magnetic field strength in the axial direction (necessary for the Hall sensors).

A rotor formed in this manner does not require any glue and is simple to assemble. Also no balancing is needed. The molding material 33 also fills the slots 31.

Figure 10:
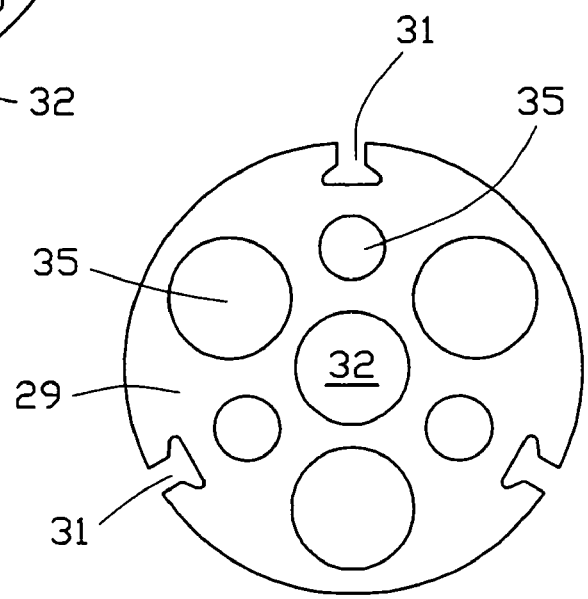
FIG. 10 is a plan view of a second embodiment of a modified rotor lamination.

FIG. 10 shows an alternative rotor lamination having six apertures 35 therein. These apertures 35 are equi-angularly spaced and three of the apertures are larger than the others. This reduces the weight of the rotor core 27 although, preferably, in order to avoid fuel pump rotor punch losses (i.e. losses due to turbulences of rotor in the fluid) the end laminations preferably have no such apertures 35.

Figure 11:
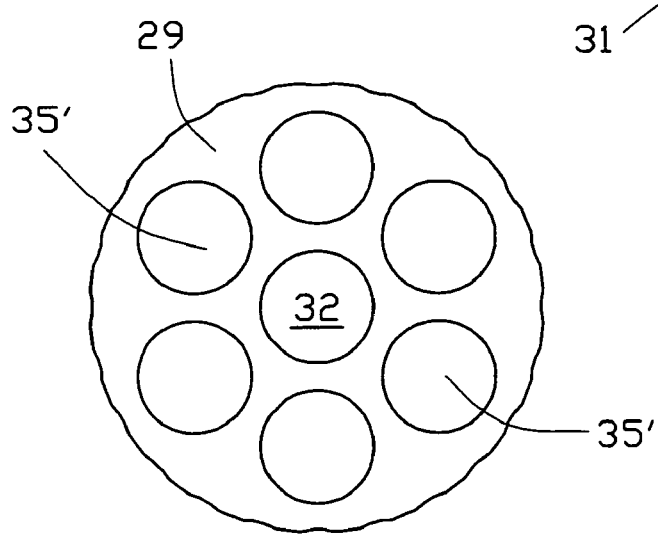
FIG. 11 is a plan view of another modified rotor lamination.

FIG. 11 shows yet a further rotor lamination having no slots 31 but an uneven, knurled peripheral surface and six apertures 35' of equal dimensions.

The stator laminations 30 shown in FIG. 9 are stamped at the same time as the rotor laminations and comprise an outer ring 36, four equi-angularly spaced, radially inwardly extending pole pieces 37 around which windings (not shown) are wound and four flux pieces between the pole pieces 37. A stack of these laminations is difficult to wind because of the small gaps between the pole shoes 37 and the flux pieces 38. Also, external coil winding around pole pieces with subsequent insertion onto outer ring is not recommended for small-sized motors.

Figure 12:
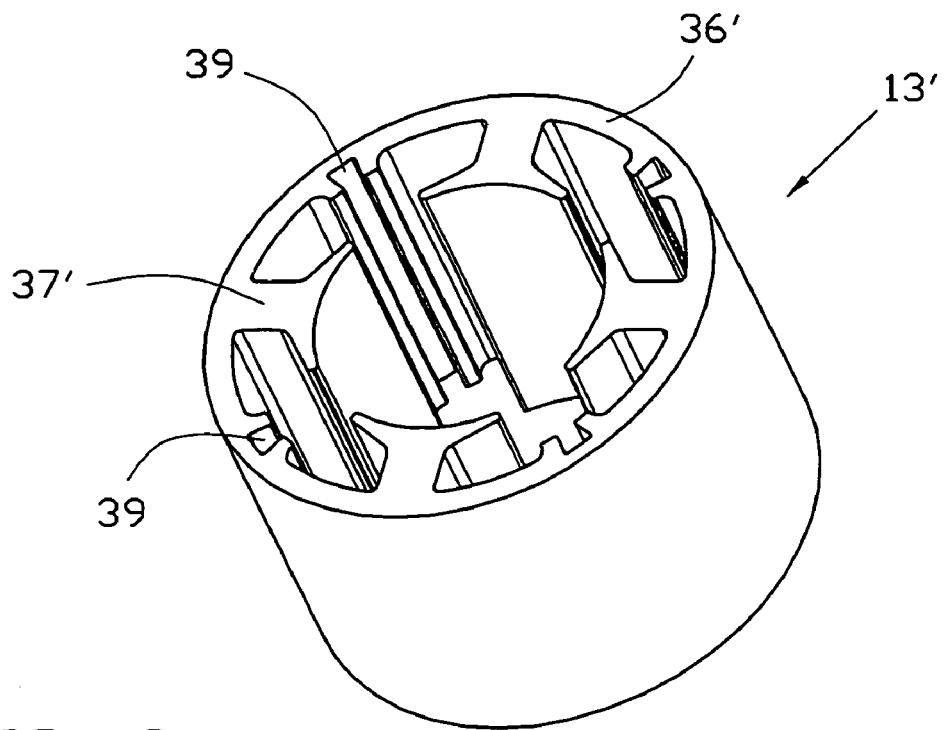
FIG. 12 is a perspective fragmentary view of an alternative stator.
Figure 13:
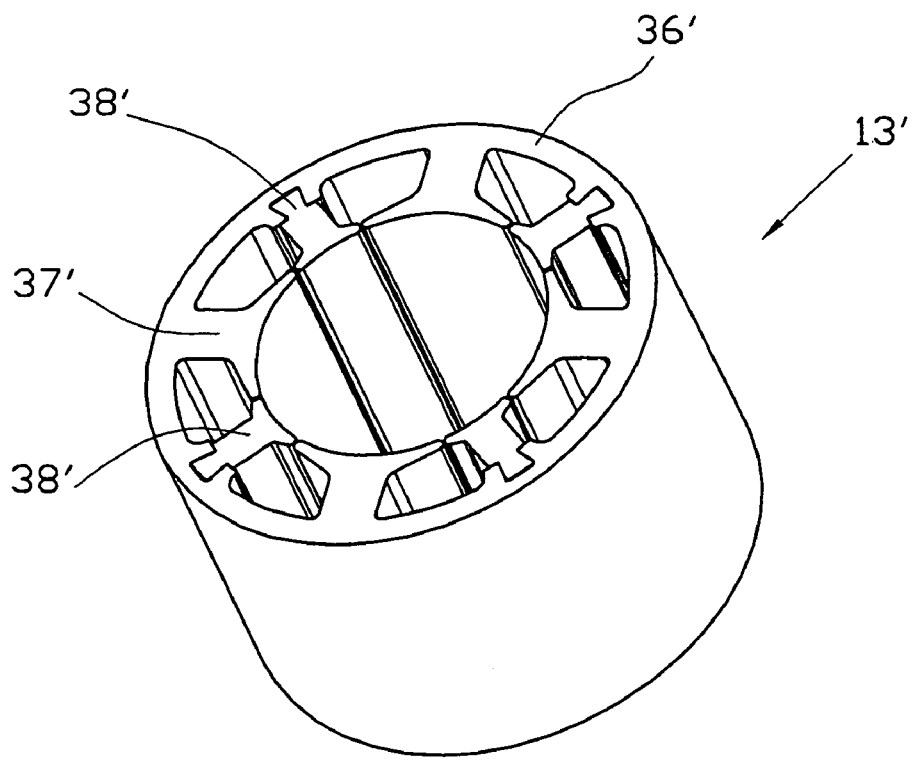
FIG. 13 is a perspective view of the stator shown in FIG. 11 with the flux pieces added.

In one aspect of the invention, and as shown in FIGS. 12 and 13, an alternative stator 13', has an outer ring 36', a plurality of angularly spaced pole pieces 37' extending radially inwardly from the outer ring 36' and a plurality of flux pieces 38' between the pole pieces 37'. The flux pieces 38' are separate from the ring 36' and pole pieces 37' and are slidable into slots 39 defined by the outer ring 36' subsequent to winding of the pole pieces 37'. This simplifies the winding process and allows the flux pieces 38 to be optimally shaped.

The ring 36' and pole pieces 37' are integrally formed and could be formed of stamped laminations secured together such as by laser welding/package punching or more preferably are formed in a unitary construction by molding soft-magnetic sintered material.

The embodiments described above are given by way of example only and various modifications will be apparent to persons skilled in the art without departing from the scope of the invention as defined in the appended claims. For example, the rotor could surround the stator, more particularly when used as fan motors or storage drives.

What is claimed is:

1. A brushless direct current motor comprising:
a wound stator and a permanent magnet rotor, the rotor having a laminated core, said laminated core being overmolded with overmolding material magnetized subsequent to molding;
wherein the stator surrounds the rotor and has an outer ring, a plurality of angularly spaced pole pieces extending inwardly from the outer ring and a plurality of flux pieces extending inwardly from the outer ring and located between adjacent pairs of the pole pieces, the outer ring forming a plurality of slots on an inner surface thereof for slidably receiving the flux pieces after applying windings to the pole pieces;
wherein the overmolding material forms an integral ring and is magnetized to act as an encoding disk;
wherein the core of the rotor has a plurality of angularly spaced slots extending inwardly from its outer peripheral surface and the slots are filled with said material; and
wherein at least some of the laminations have a plurality of spaced apertures therein.

2. The motor of claim 1, wherein the outer peripheral surfaces of the laminations are uneven.

3. The motor of claim 2, wherein the outer peripheral surfaces of the laminations are knurled.

4. The motor of claim 1, further comprising sensors for sensing the position of the rotor relative to the stator and electronic circuitry for switching the current in the stator windings in response to outputs from the sensors to cause the rotor to rotate relative to the stator.

5. The motor of claim 1, further comprising a sleeve at one end of the motor for supporting or defining a bearing for the rotor and for attachment to a fuel pump.

6. The motor of claim 1, wherein the angularly spaced slots have a smaller dimension along the peripheral surface of the rotor than an end of the slot inside the rotor.

7. The motor of claim 1, wherein the slots are axially extending and receive the flux pieces in the axial direction.

8. The motor of claim 1, wherein the integral ring has a higher magnetic field strength in the axial direction.

9. The motor of claim 1, wherein the overmolding material is thermoplastic bonded NdFeB compound.

10. The motor of claim 1, wherein the integral ring has a different diameter than the overmolding material which is not forming the integral ring.

11. The motor of claim 1, wherein the integral ring is formed on an axial end of the laminated core.

12. The motor of claim 1, wherein the core of the rotor has indentations for receiving said overmolding material.

13. The motor of claim 1, wherein the integral ring is formed from NdFeB compound on an axial end of the laminated core, has a smaller diameter than the overmolding material not forming the integral ring, and has a higher magnetic field strength in the axial direction.

* * * * *